(12) United States Patent
Sautter et al.

(10) Patent No.: US 8,136,708 B2
(45) Date of Patent: Mar. 20, 2012

(54) LOAD-CARRYING MEMBERS FOR VEHICLE ROOFS

(75) Inventors: Chris Sautter, Portland, OR (US); Mike Kemery, Portland, OR (US); Zac Elder, Portland, OR (US); Jeff Castro, Portland, OR (US); Eric Roesinger, Portland, OR (US); Kevin Lesley, Beaverton, OR (US)

(73) Assignee: Yakima Products, Inc., Beaverton, OR (US)

( * ) Notice: Subject to any disclaimer, the term of this patent is extended or adjusted under 35 U.S.C. 154(b) by 887 days.

(21) Appl. No.: 12/217,773

(22) Filed: Jul. 7, 2008

(65) Prior Publication Data

US 2009/0120982 A1    May 14, 2009

Related U.S. Application Data

(60) Provisional application No. 60/958,476, filed on Jul. 6, 2007, provisional application No. 60/958,475, filed on Jul. 6, 2007, provisional application No. 60/958,570, filed on Jul. 6, 2007.

(51) Int. Cl.
*B60R 9/04* (2006.01)

(52) U.S. Cl. ........ 224/321; 224/319; 224/324; 224/282; 224/568; 410/97

(58) Field of Classification Search .......... 224/315, 224/319, 321, 324, 282, 550, 558, 406, 568; 114/381; 296/157; 211/21; 414/462; 410/8, 410/49, 97, 105–106, 110, 116; 206/478; 248/499

See application file for complete search history.

(56) References Cited

U.S. PATENT DOCUMENTS

| 1,807,104 | A | * | 5/1931 | Schat | 114/381 |
| 2,674,141 | A | * | 4/1954 | Cowan | 81/3.27 |
| 4,081,118 | A | * | 3/1978 | Mason | 224/324 |
| 4,333,575 | A | * | 6/1982 | Wong | 211/118 |

(Continued)

FOREIGN PATENT DOCUMENTS

DE    3543514 A  *  6/1986

(Continued)

OTHER PUBLICATIONS

USPTO Office Action for U.S. Appl. No. 12/217,770, dated Jun. 30, 2011, 19 pages total.

*Primary Examiner* — Justin Larson
*Assistant Examiner* — John Cogill
(74) *Attorney, Agent, or Firm* — Kolisch Hartwell, P.C.

(57) ABSTRACT

Load-carrying members for vehicle roofs are disclosed. In some examples, the load-carrying members may be configured for use with a crossbar mounted to a vehicle roof. In some examples, the load-carrying members may include a body and an arm pivotably mounted to the body. The body may have a load-bearing surface and may be configured to engage the crossbar and retain the load-carrying member proximate the crossbar. The arm may be configured to pivot between a first position and a second position and about an axis that is transverse to the crossbar. In some examples, the load-carrying members may include a pair of spaced apart mounting blocks and a clamping member configured to engage the crossbar in opposition to the pair of spaced apart mounting blocks. In some examples, the load-carrying members may be configured for carrying a boat on a vehicle roof.

19 Claims, 9 Drawing Sheets

U.S. PATENT DOCUMENTS

| | | | |
|---|---|---|---|
| 5,094,373 A | 3/1992 | Lovci | |
| 5,516,017 A * | 5/1996 | Arvidsson | 224/310 |
| 5,685,686 A | 11/1997 | Burns | |
| 5,820,002 A | 10/1998 | Allen | |
| 5,951,231 A * | 9/1999 | Allen | 414/462 |
| 5,996,870 A * | 12/1999 | Shaver | 224/532 |
| D422,553 S | 4/2000 | VonDuyke | |
| 6,164,507 A * | 12/2000 | Dean et al. | 224/324 |
| 6,283,310 B1 | 9/2001 | Dean et al. | |
| 6,367,673 B1 | 4/2002 | Smith et al. | |
| 6,390,309 B1 * | 5/2002 | Tucker | 211/85.7 |
| 6,422,441 B1 | 7/2002 | Settelmayer et al. | |
| 6,460,743 B2 * | 10/2002 | Edgerly et al. | 224/324 |
| 6,561,396 B2 * | 5/2003 | Ketterhagen | 224/310 |
| 6,683,199 B1 | 1/2004 | Chen et al. | |
| 6,868,998 B2 | 3/2005 | Dean | |
| 6,918,521 B2 | 7/2005 | Settelmayer et al. | |
| 7,131,561 B2 * | 11/2006 | Humes | 224/319 |
| 7,434,714 B2 * | 10/2008 | Huang | 224/497 |
| 7,481,344 B2 * | 1/2009 | Naslund et al. | 224/319 |
| 7,780,050 B2 * | 8/2010 | Tucker | 224/310 |
| 7,810,686 B2 * | 10/2010 | Ilgenfritz | 224/324 |
| 7,815,083 B2 | 10/2010 | Clausen | |
| 2002/0125282 A1 * | 9/2002 | Laverack et al. | 224/319 |
| 2005/0077335 A1 * | 4/2005 | Bourne | 224/319 |
| 2006/0273122 A1 * | 12/2006 | Bogoslofski et al. | 224/324 |
| 2006/0273124 A1 | 12/2006 | Bogoslofski | |
| 2006/0289577 A1 | 12/2006 | Malone | |
| 2007/0119888 A1 * | 5/2007 | Chuang | 224/427 |
| 2007/0164065 A1 * | 7/2007 | Davis | 224/324 |
| 2008/0190979 A1 * | 8/2008 | Robins et al. | 224/492 |
| 2008/0193265 A1 | 8/2008 | Sautter | |
| 2009/0120982 A1 | 5/2009 | Sautter | |
| 2009/0120983 A1 * | 5/2009 | Magnusson | 224/324 |

FOREIGN PATENT DOCUMENTS

| | | |
|---|---|---|
| DE | 10007078 A1 * | 8/2001 |
| FR | 2574875 A1 | 6/1986 |
| FR | 2684621 A1 * | 6/1993 |
| JP | 2002052985 | 2/2002 |
| JP | 2002052985 A * | 2/2002 |

* cited by examiner

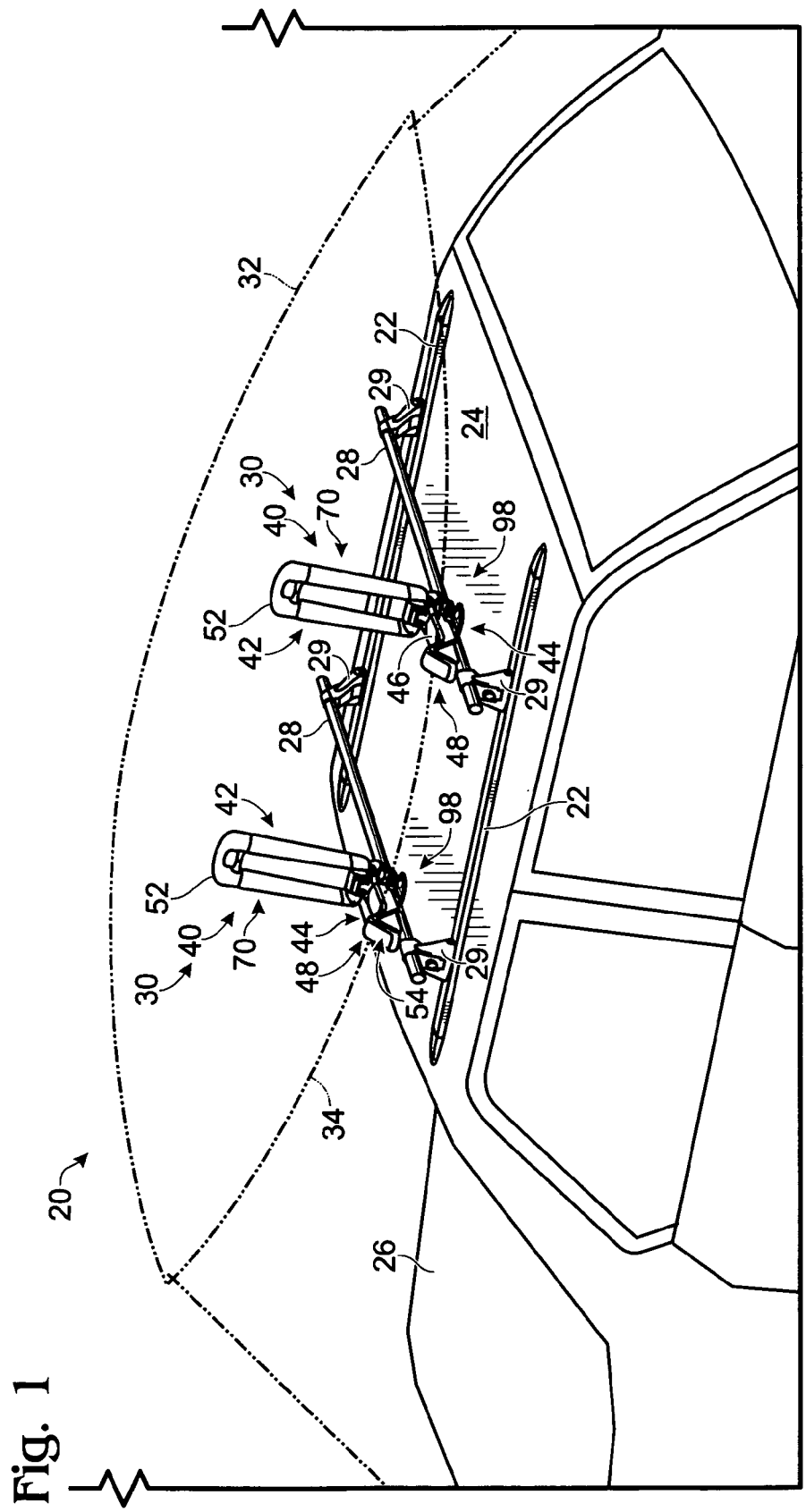

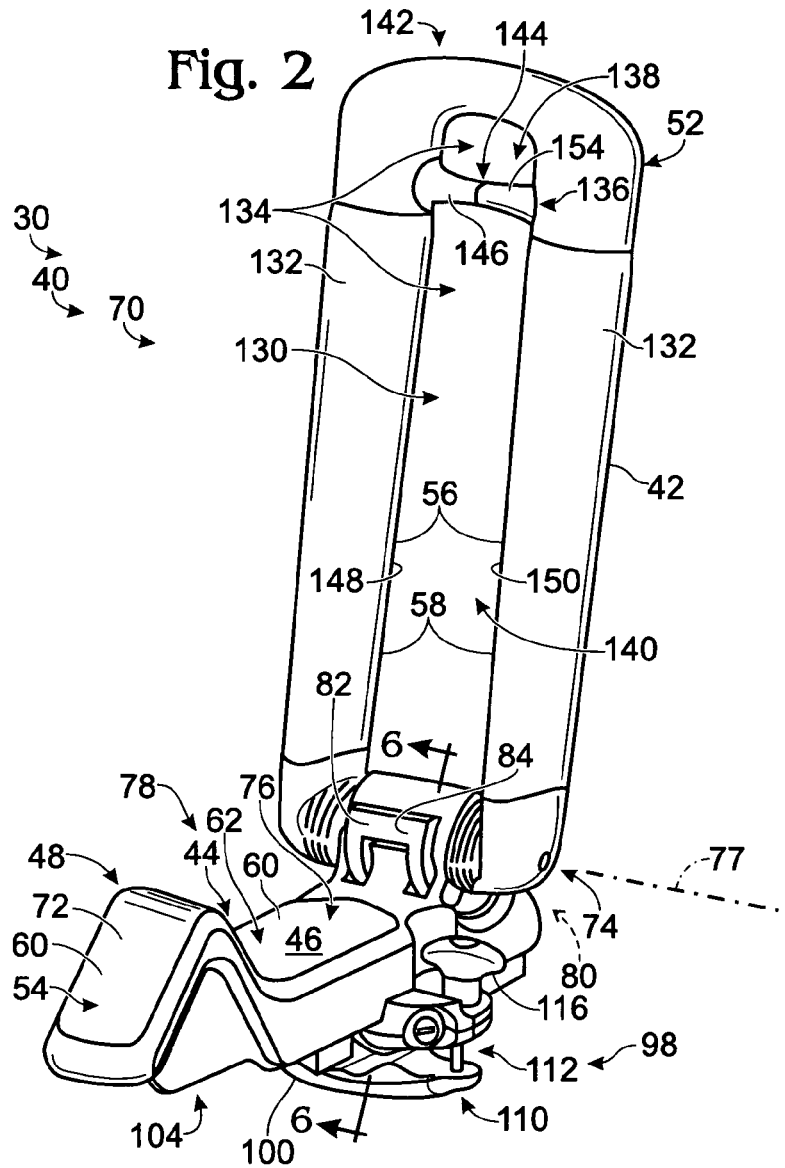
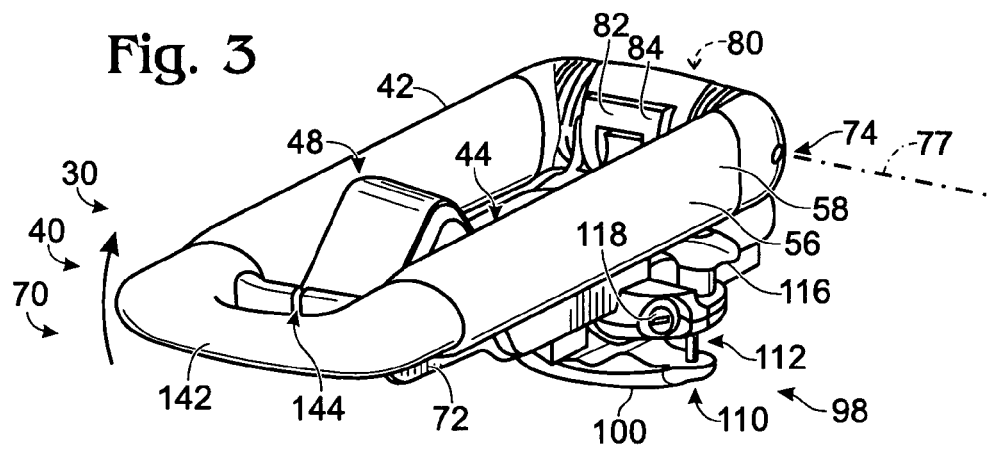

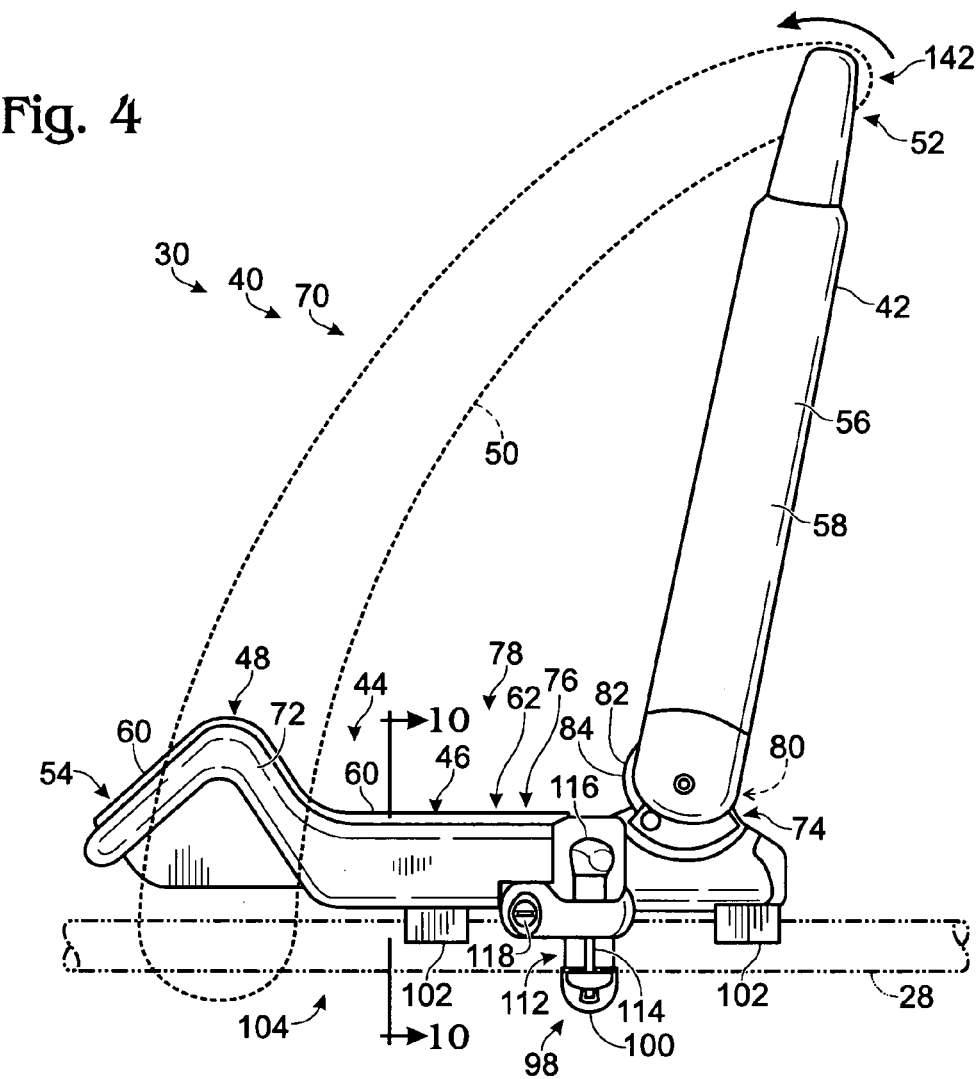
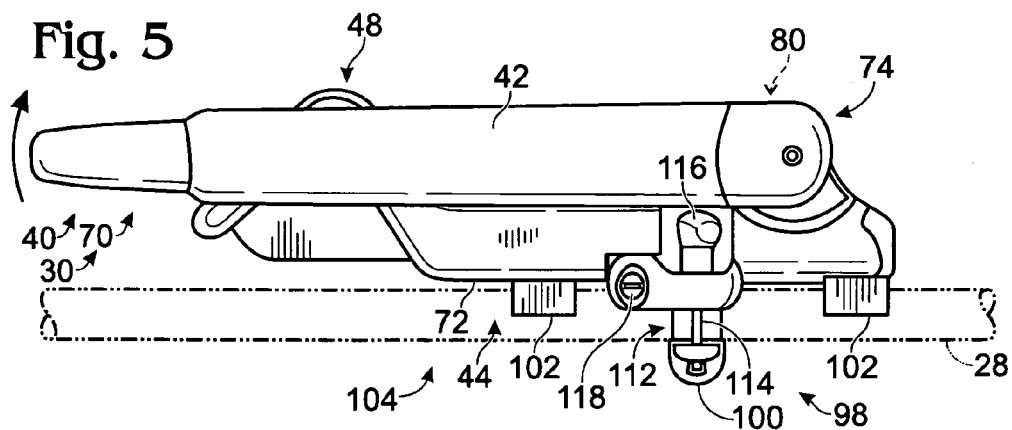

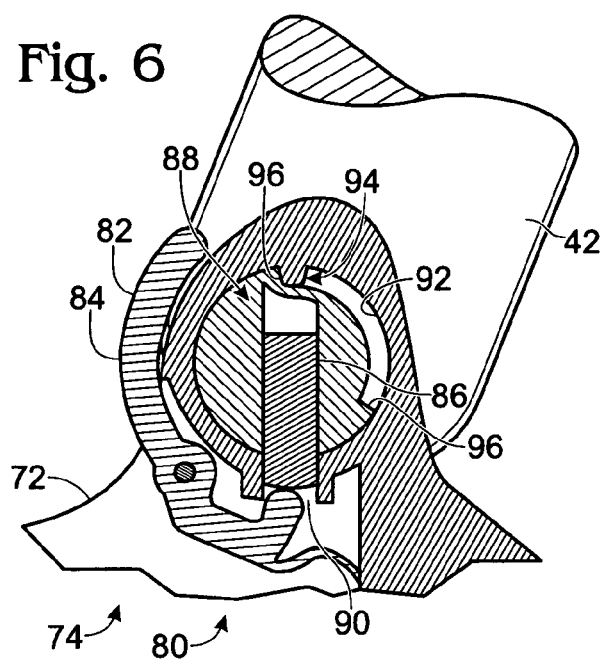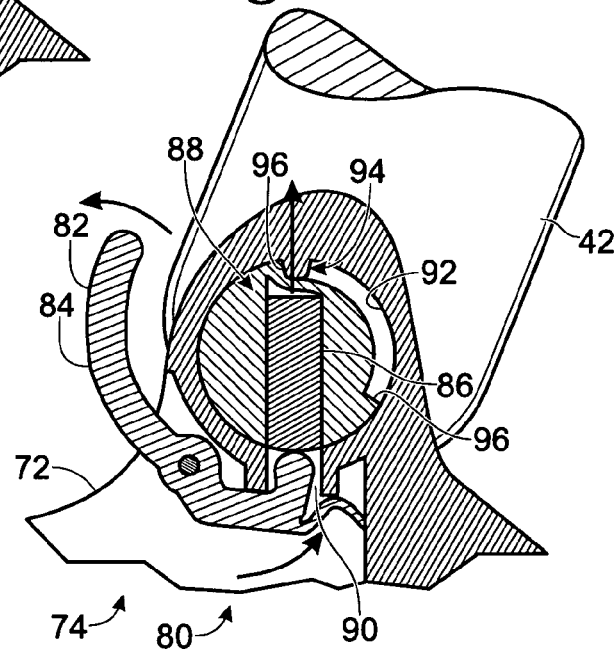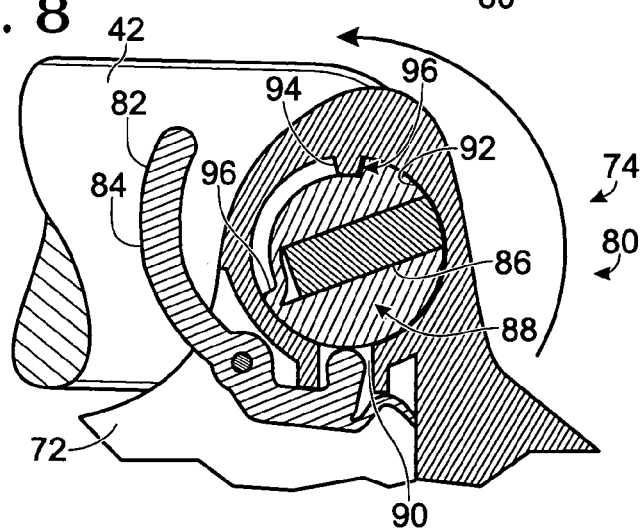

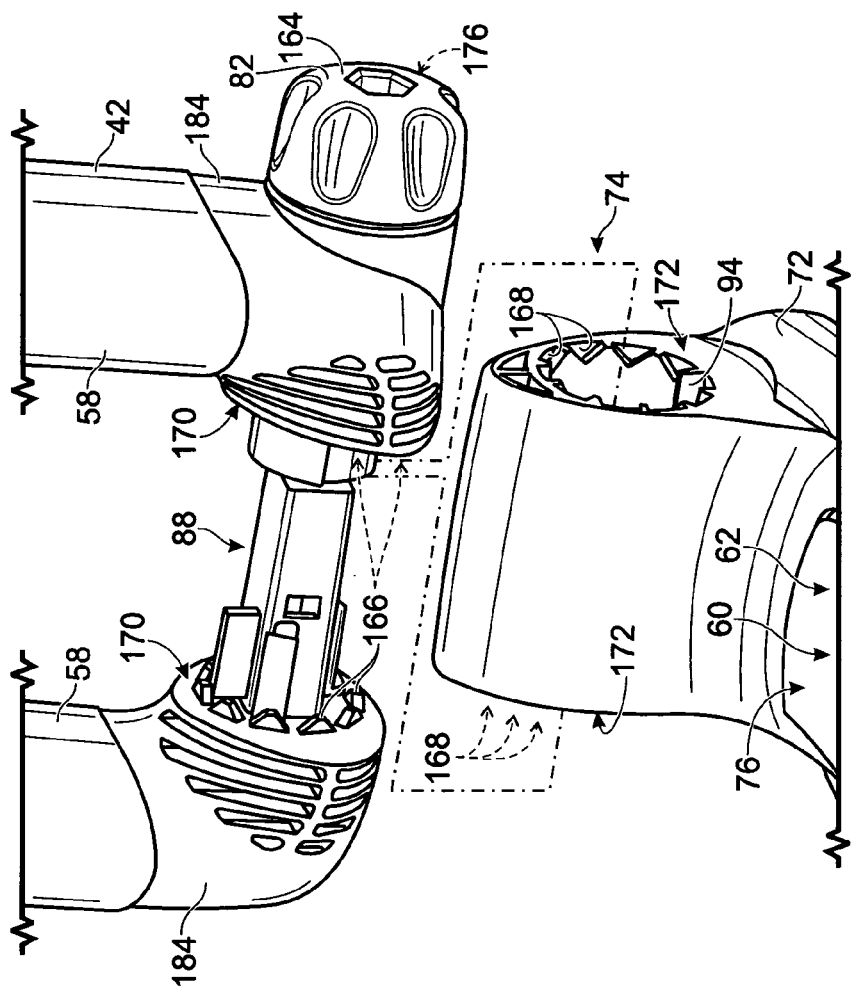
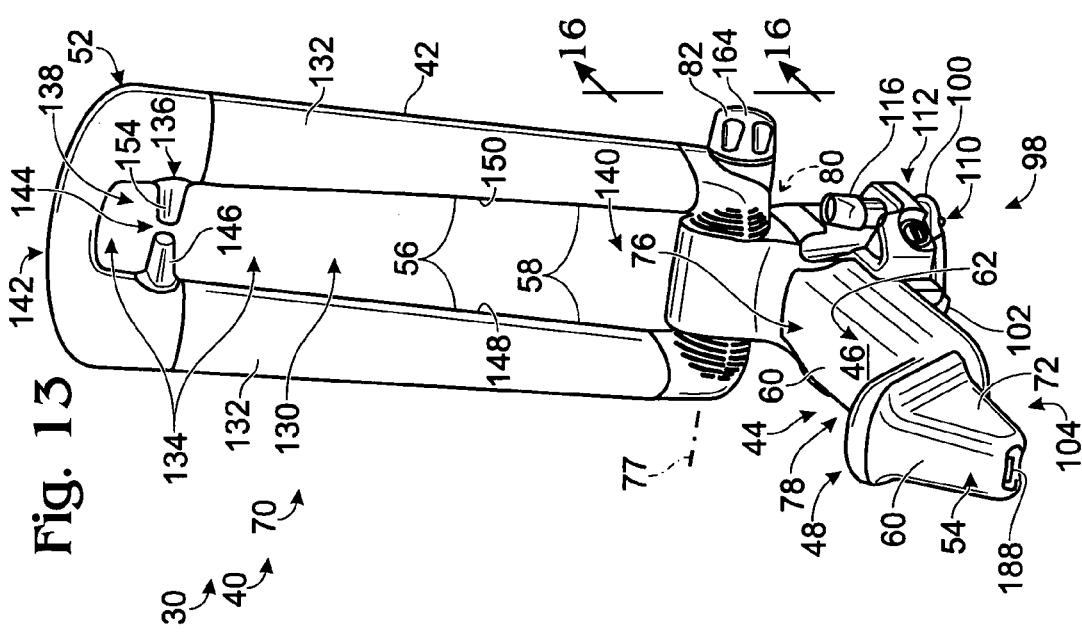

LOAD-CARRYING MEMBERS FOR VEHICLE ROOFS

CROSS-REFERENCE TO RELATED APPLICATIONS

This application claims priority under 35 U.S.C. §119(e) to U.S. Provisional Patent Application Ser. No. 60/958,476, which was filed on Jul. 6, 2007 and is entitled "Folding J-cradle Boat Mount;" to U.S. Provisional Patent Application Ser. No. 60/958,475, which was filed on Jul. 6, 2007 and is entitled "Vehicle Boat Loading Device;" and to U.S. Provisional Patent Application Ser. No. 60/958,570, which was filed on Jul. 6, 2007 and is entitled "Recreational Gear Retention System." The complete disclosures of the above-identified patent applications are hereby incorporated by reference for all purposes.

This application also incorporates by reference in its entirety U.S. patent application Ser. No. 12/217,770 filed Jul. 7, 2008 and entitled "Load-Supporting Device."

FIELD OF THE INVENTION

The present disclosure relates generally to vehicle-mounted racks, and more particularly to load-carrying members for use with a crossbar mounted to a vehicle roof.

BACKGROUND

Vehicles are often fitted with racks for carrying cargo boxes, recreational equipment mounts, and various other types of load carriers. These vehicle racks may include crossbars, rails, or other elongate structural members extending over the roof of the vehicle or adjacent the rear of the vehicle. For example, typical roof rack systems include longitudinal rails running parallel to the length of the vehicle, with one or more crossbar members extending between the longitudinal rails. Load carriers are often attached to the rails or crossbars of a vehicle rack by using a connecting device.

Rails and crossbars for vehicle rack systems are provided in an increasing range of shapes, sizes and rotational orientations in order to accommodate a widening array of aesthetic and functional requirements. A connecting device designed to fit a certain bar or range of bar shapes or sizes might not be compatible with other bars having other shapes, sizes or rotational orientations. Accordingly, a load carrier manufacturer might provide various connecting devices for use with different shapes, sizes and rotational orientations of rails and/or crossbars. This means that the manufacturer incurs additional costs associated with manufacturing various connector devices, and retailers incur the additional costs associated with stocking the various connector devices. Logistics of selecting appropriate mounting hardware at the point of sale may also be a complicated process. Furthermore, a consumer may need to purchase a different type of connector device for each vehicle or rack on which the consumer desires to mount a particular load carrier.

Vehicle roof racks are often used for carrying boats such as canoes or kayaks. One type of vehicle roof rack for carrying boats is generically referred to as the J-cradle. J-cradle boat racks include a J-shaped mount that is often configured to hold a boat, such as a kayak, on an edge, typically at a slight inclination from the vertical. The slight inclination of the boat assists a user in steadying the boat while it is strapped to the rack. An example of a J-cradle boat rack is shown in U.S. Pat. App. Pub. 2006/0289577, the complete disclosure of which is incorporated by reference in its entirety for all purposes.

In some examples, load-carrying members for use with a crossbar mounted to a vehicle roof may include a body and an arm pivotably mounted to the body. The body may have a load-bearing surface and may be configured to engage the crossbar and retain the load-carrying member proximate the crossbar. The arm may be configured to pivot, about an axis that is transverse to the crossbar, between a first position, in which the arm is proximate the load bearing surface, and a second position, in which the arm is transverse to the load-bearing surface.

In some examples, load-carrying members for use with a crossbar mounted to a vehicle roof may include a body configured to support a load, a pair of spaced apart mounting blocks, and a clamping member. The pair of spaced apart mounting blocks may be disposed on the body and configured to engage the crossbar. The clamping member may be connected to the body and disposed between the pair of spaced apart mounting blocks. The clamping member may be configured to engage the crossbar in opposition to the pair of spaced apart mounting blocks to selectively secure the body to the crossbar.

In some examples, load-carrying members may be configured for securing or carrying a boat on a vehicle roof and may include a body and an arm pivotably attached to the body. The body may have a load-bearing surface configured to support a lateral edge of the boat. The arm may be configured to pivot, about an axis that is transverse to the crossbar, between a first position, in which the arm is proximate the load bearing surface, and a second position, in which the arm is transverse to the load-bearing surface. In the second position, the arm may be configured to support the boat in a transverse orientation relative to the roof.

DRAWINGS

FIG. 1 is a perspective view of a nonexclusive illustrative example of a vehicle roof rack for carrying boats, shown installed on a vehicle roof, with the roof rack including a pair of load-carrying members in the form of folding J-cradle boat mounts.

FIG. 2 is a perspective view of a nonexclusive illustrative example of a load-carrying member in the form of a folding J-cradle boat mount, shown with its arm in an upright or extended position.

FIG. 3 is a perspective view of the folding J-cradle boat mount of FIG. 2, shown with the arm in a stowed or folded position.

FIG. 4 is a front view of the folding J-cradle boat mount of FIG. 2, shown with the arm in an upright or extended position.

FIG. 5 is a front view of the folding J-cradle boat mount of FIG. 2, shown with the arm in a stowed or folded position.

FIG. 6 is a section view of the folding J-cradle boat mount of FIG. 2 showing a nonexclusive illustrative example of a locking mechanism for the arm, taken generally along line 6-6 in FIG. 2 and shown with the arm locked in an upright or extended position.

FIG. 7 is a section view of the arm locking mechanism of FIG. 6, with the arm locking mechanism shown in an unlocked configuration.

FIG. 8 is a section view of the arm locking mechanism of FIG. 6, with the arm shown in a stowed or folded position.

FIG. 13 is a perspective view of another nonexclusive illustrative example of a load-carrying member in the form of a folding J-cradle boat mount, shown with its arm in an upright or extended position.

FIG. 14 is an exploded view of the folding J-cradle boat mount of FIG. 13, showing a nonexclusive illustrative example of a locking mechanism for the arm.

DESCRIPTION

Figure 9:
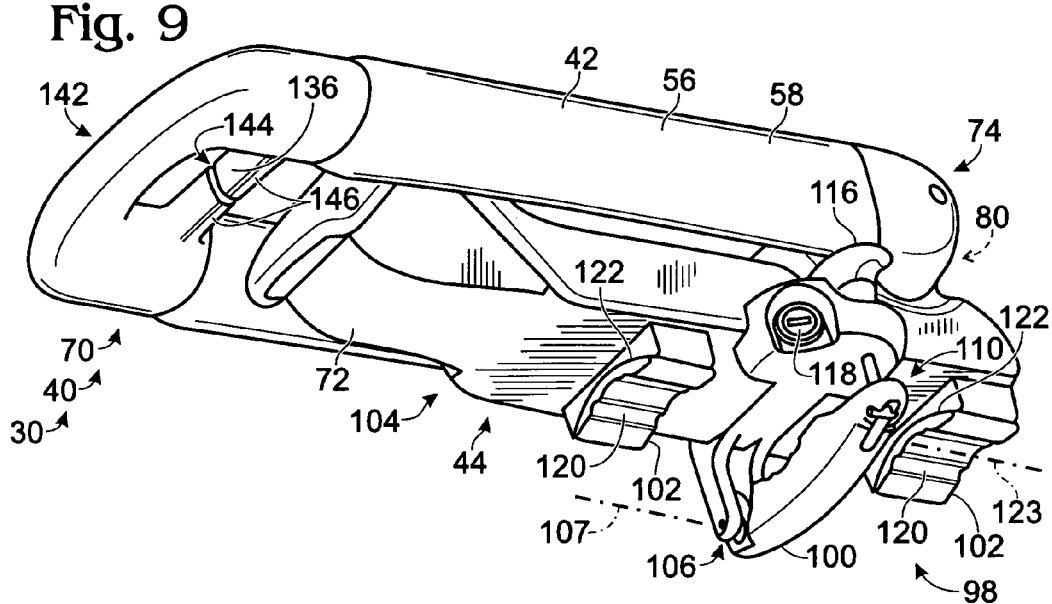
FIG. 9 is a perspective bottom view of the folding J-cradle boat mount of FIG. 2, shown with the arm in a stowed or folded position.

The present disclosure describes a system and apparatus for securing a load to a vehicle-mounted rack. Vehicle racks may be mounted on any type of vehicle (e.g., car, van, truck, etc.), and many vehicle manufacturers include factory-installed racks on some vehicle models. While racks are often mounted on the roofs of vehicles, racks may also be mounted on other parts of a vehicle, such as the trunk or rear of the vehicle. Vehicle racks include bars, such as crossbars and rails, for securing and supporting loads.

A nonexclusive illustrative example of a vehicle roof rack is shown generally at 20 in FIG. 1. Unless otherwise specified, vehicle roof rack 20 and/or its various components may, but are not required to, contain at least one of the structure, components, functionality, and/or variations described, illustrated, and/or incorporated herein. As shown in FIG. 1, the vehicle roof rack 20 may include a pair of rails 22 attached to the roof 24 of a vehicle 26. At least one crossbar 28 extends between the rails 22. In the example shown in FIG. 1, the rack 20 includes first and second crossbars. In some examples, the crossbars 28 may be supported or mounted relative to the roof 24 and/or the rails 22 by any suitable structure, such as a pair of towers 29. A load-carrying member 30, which is configured to at least partially support a load, is mounted, secured and/or supported by at least one of the crossbars 28. In the example shown in FIG. 1, the rack 20 includes first and second load-carrying members 30 mounted or secured to the first and second crossbars 28. Examples of load-carrying members and mounting methods are described in U.S. Pat. Nos. 5,820,002; 5,685,686; 5,951,231; 5,094,373; 6,286,738; 6,164,507; D422,553; 6,283,310; 6,425,509; 6,283,310; 6,367,673; 6,422,441; and 6,918,521; U.S. Pat. App. Pub. 2006/0086766; and U.S. patent application Ser. No. 11/975,734, which was filed on Oct. 19, 2007 and is entitled "Vehicle Boat Loading Device;" the complete disclosures of which are incorporated by reference in their entirety for all purposes.

As shown in FIG. 1, each load-carrying member 30 may be in the form of a J-cradle boat mount 40, which may be a folding J-cradle boat mount, which is suitable for securing or carrying a boat 32, such as a kayak. Although the load-carrying member 30 in the examples presented herein is shown in the form of folding J-cradle boat mounts, it should be understood that a load-carrying member 30 and/or its various components may be configured and/or used for the carriage of a wide range of articles, and references to "a boat" should be understood to encompass any load or article that might be carried on, and/or supported by, the load-carrying member 30.

The J-cradle boat mount 40 includes a generally upright arm 42 and a foot 44. As shown in FIGS. 1 and 4, the arm 42 may be transversely oriented relative to the foot 44. By "transverse" or "transversely," it is meant that the indicated members are obliquely or perpendicularly oriented. For example, the arm 42 may be inclined relative to the vertical at a suitable angle, such as approximately 5, 10, 15 or even 20 or more degrees, relative to a vertical plane. The foot 44 may include a load bearing surface 46, which may be at least partially upwardly oriented or facing, and a retaining lip or bulge, such as protrusion 48, which may be a part of the load bearing surface. As shown in FIG. 1, when loaded onto the J-cradle boat mount 40, a side edge 34 of the boat 32 rests, or is supported, on the load bearing surface 46 and a major surface of the boat, such as the deck or lower hull, rests against, or is supported by, the arm 42. As shown and suggested in FIGS. 1 and 4, the boat 32 may be secured to the J-cradle boat mount 40 with a flexible strap 50, which may be secured to the top end 52 of the arm 42 and to a suitable lower point, such as the crossbar 28, such as between the towers 29. The protrusion 48 may be configured to at least partially support the boat 32, such as while a user is strapping it into the J-cradle boat mount 40. For example, the side edge 34 may rest on the load bearing surface 46 and against the protrusion 48, such that the protrusion 48 may engage the boat 32 and retain it in a transverse orientation, as shown in FIG. 1.

In some examples, the J-cradle boat mount 40 may include a loading ramp 54, which may be integral with the protrusion 48, as shown in FIGS. 1 and 2. The loading ramp 54 may be configured to assist with loading a boat 32 onto the J-cradle boat mount 40. For example, the loading ramp 54 may assist a user with lifting the boat 32, or other article, over the protrusion 48 and onto the load-bearing surface 46, such as by guiding the boat 32 over the protrusion 48 and onto the load-bearing surface 46.

In some examples, some or all of the surfaces of the J-cradle boat mount 40 that contact the boat 32 may be padded. For example, as shown in FIGS. 2 and 4, the upright portions 56 of the arm 42 may be at least partially padded, with padding 58 along a substantial portion of their length. In some examples, the padding 58 may be circumferentially continuous and/or the padding may extend along the upright portion 56 in a continuous or uninterrupted manner. Padding that is continuous along the length of the upright portions 56 may provide a relatively continuous surface without significant obstacles, which may provide easier loading of the boat into the mount because the hull of the boat may be relatively continuously slid along the continuous padding. In some examples, the load bearing surface 46 may be at least partially padded. For example, as shown in FIG. 4, a padding layer 60 may be applied to at least a portion of the load bearing surface 46, such as the portion 62 of the load bearing surface that is proximate the arm 42. In some examples, the padding layer 60 may extend at least partially along the protrusion 48 and/or the loading ramp 54. Such padding on the surfaces of the J-cradle boat mount 40 may improve boat protection during loading and unloading as well as during use.

Suitable padding materials may include a felt material or a resilient plastic foam material, such as ethylene-vinyl acetate ("EVA") foam or the like, either separately or in combination. For example, both the padding 58 on the upright portions 56 of the arm 42 and the padding layer 60 on at least a portion of the load bearing surface 46 may be EVA foam. In some examples, padding layer 60 may include a felt, which may protect the exterior surfaces of the boat and/or provide a reduced-friction surface along which the boat may more readily slide during loading and unloading.

A nonexclusive illustrative example of a load-carrying member 30 in the form of a folding J-cradle boat mount is shown generally at 70 in FIGS. 1-5. Unless otherwise specified, the folding J-cradle boat mount 70 may, but is not required to, contain at least one of the structure, components, functionality, and/or variations described, illustrated, and/or incorporated herein. Furthermore, the structures, components, functionalities, and/or variations described, illustrated, and/or incorporated herein in connection with the folding J-cradle boat mount 70 may, but are not required to, be included in other load-carrying members 30. The folding J-cradle boat mount 70 includes an arm 42 that is pivotably mounted or attached to a base or body 72. The body 72 provides the foot 44 of the boat mount and includes a load-bearing surface 46 such that the body 72 may be configured to support a load.

The arm 42 may be pivotably attached to a hub 74 disposed on the body 72. In the example shown in FIGS. 2-5, the hub 74 is disposed proximate a first region 76 of the load bearing surface 46. The arm 42 may be configured to pivot relative to the hub 74 and body 72 about an axis 77 that is transverse to the crossbar 28. In the example shown in FIGS. 2-5, although it is spaced from the crossbar 28, the axis 77 is perpendicular to the crossbar 28.

The arm 42 may be configured to pivot between a first or folded position, as shown in FIGS. 3 and 5, and a second or upright position, as shown in FIGS. 2 and 4. In the folded position, the arm 42 may be proximate the load bearing surface 46, and/or the arm 42 may extend generally along the crossbar 28. In the example shown in FIGS. 3 and 5, the arm 42 extends generally parallel to the crossbar 28 when it is in the folded position. In the upright position, the arm 42 may be transverse to the load-bearing surface 46 and/or to the crossbar 28, such that the arm 42 may be configured to support an article, such as the boat 32, in a transverse orientation relative to the roof 24 of the vehicle 26, as suggested in FIG. 1. Unlike non-folding J-cradle boat mounts, pivoting the arm 42 into the folded position when the rack is not in use permits a reduced height or lower profile for the rack when the rack is not in use. Such a reduced height or lower profile for the empty rack may provide reduced aerodynamic drag and/or reduce the height of the rack when the rack is not in use.

As shown in FIG. 4, the protrusion 48 may be spaced from the hub 74 and the first region 76 of the load-bearing surface 46 such that a load-receiving region 78 may be defined between the protrusion 48 and the hub 74. Thus, when the arm 42 is in its upright position, as shown in FIG. 4, the arm 42 and the protrusion 48 may be configured to at least partially retain, within the load-receiving region 78, an article, such as the boat 32, that is disposed on the load-bearing surface 46.

In some examples, the folding J-cradle boat mount 70 may be configured to selectively and/or automatically lock the arm 42 into one or more positions. For example, the folding J-cradle boat mount 70 may be configured to lock the arm into at least one of the folded position and/or the upright position. In some examples, the folding J-cradle boat mount 70 may be configured to lock the arm 42 into a plurality of upright positions, which may include at least one position intermediate the folded and upright positions. For example, the folding J-cradle boat mount 70 may be configured to lock the arm 42 at various angles relative to the load bearing surface 46, such as where the arm 42 is locked in the upright position as shown in FIG. 6. Suitable angles may include approximately 60 or less, 75, 80, 85, 90, 105, 100, 105, or even 120 or more degrees.

A nonexclusive illustrative example of a suitable locking mechanism for the folding J-cradle boat mount 70 is shown generally at 80 in FIGS. 6-8. The locking mechanism 80 may include an actuator 82, such as lever 84, that engages a locking pin 86. In some examples, the locking mechanism 80 may include a plurality of locking pins 86. For example, the locking mechanism 80 may include a pair of locking pins 86. In the locked condition, the locking pins 86, which may be captured within a pivot axle 88 of the arm 42, may be biased to extend into corresponding cavities 90 in the body 72, as shown in FIG. 6. The locking pins 86 may be moved to the unlocked condition by moving the lever 84 such that the locking pins are driven out of the cavities 90 and into the pivot axle 88, as shown in FIG. 7. The locking pins 86 may be retained in the unlocked condition (i.e., contained within the pivot axle 88) by the walls 92 of the hub 74 when the arm 42 is in a position in which it may not be locked, as shown in FIG. 8. For example, the locking mechanism 80 may be configured such that the arm 42 is not locked when in the folded position, as shown in FIG. 8. Although shown with only a single set of cavities 90 in FIGS. 6-8, it should be understood that the locking mechanism 80 may include multiple sets of cavities 90 such that the arm may be locked in a plurality of positions, which may include the upright position, the folded position, and/or an intermediate position.

In some examples, the hub 74 may be configured to limit the rotational range of the arm 42 relative to the body 72. For example, as shown in FIGS. 6-8, one or more projections or tabs 94 may be disposed on the body 72, such as on the hub 74. The tabs 94 may be configured to engage at least one corresponding abutment or stop 96 disposed on the arm 42, such as on the pivot axle 88. As shown in FIGS. 6-8, contact between the tab 94 and either of the corresponding stops 96 impedes or prevents further rotation or pivoting of the arm 42 relative to the body 72 such that the arm 42 may only rotate or pivot through a predetermined angular range. In the example shown in FIGS. 6-8, the stops 96 are configured, such that the arm 42 may only pivot between the upright position, as shown in FIG. 6, and the folded position, as shown in FIG. 8. Although the example presented in FIGS. 6-8 includes a tab 94 on the body 72 and corresponding stops 96 on the arm 42, it should be understood that the positions of the tabs and corresponding stops may be reversed with the stops 96 being on the body 72 and the tab 94 being on the arm 42.

The folding J-cradle boat mount 70 may be configured to engage, and/or be secured to, a crossbar 28. For example, the body 72 may include at least a portion of a mounting apparatus 98 configured to engage the crossbar 28 and secure or retain the folding J-cradle boat mount 70 proximate the crossbar 28. As shown in FIGS. 4, 5 and 9-11, the mounting apparatus 98 may include a clamping member 100 and a plurality of spaced apart mounting blocks 102. In the example shown in FIGS. 4, 5 and 9-11, the clamping member 100 is disposed between, and opposes, a pair of spaced apart mounting blocks 102.

The mounting blocks 102 may be disposed on the body 72 and configured to engage the crossbar 28. For example, the mounting blocks 102 may be disposed on the body 72 opposite at least a portion of the load-bearing surface 46, such as where the mounting blocks 102 are disposed on the lower side 104 of the body 72, as shown in FIGS. 4 and 9. Inclusion of at least a pair of spaced apart mounting blocks 102 may provide an alignment between the body 72 and the crossbar 28 such as where the body 72 may be retained generally parallel to the crossbar 28.

The clamping member 100 may be pivotably or hingedly attached or connected to the body 72 and configured to provide an opposing or clamping force relative to the mounting blocks 102, which force may selectively secure or retain the body 72 relative to the crossbar 28. In the example shown in FIGS. 4, 5 and 9-11, the clamping member 100 is configured to engage the crossbar 28 in opposition to the pair of spaced apart mounting blocks 102.

Figure 10:
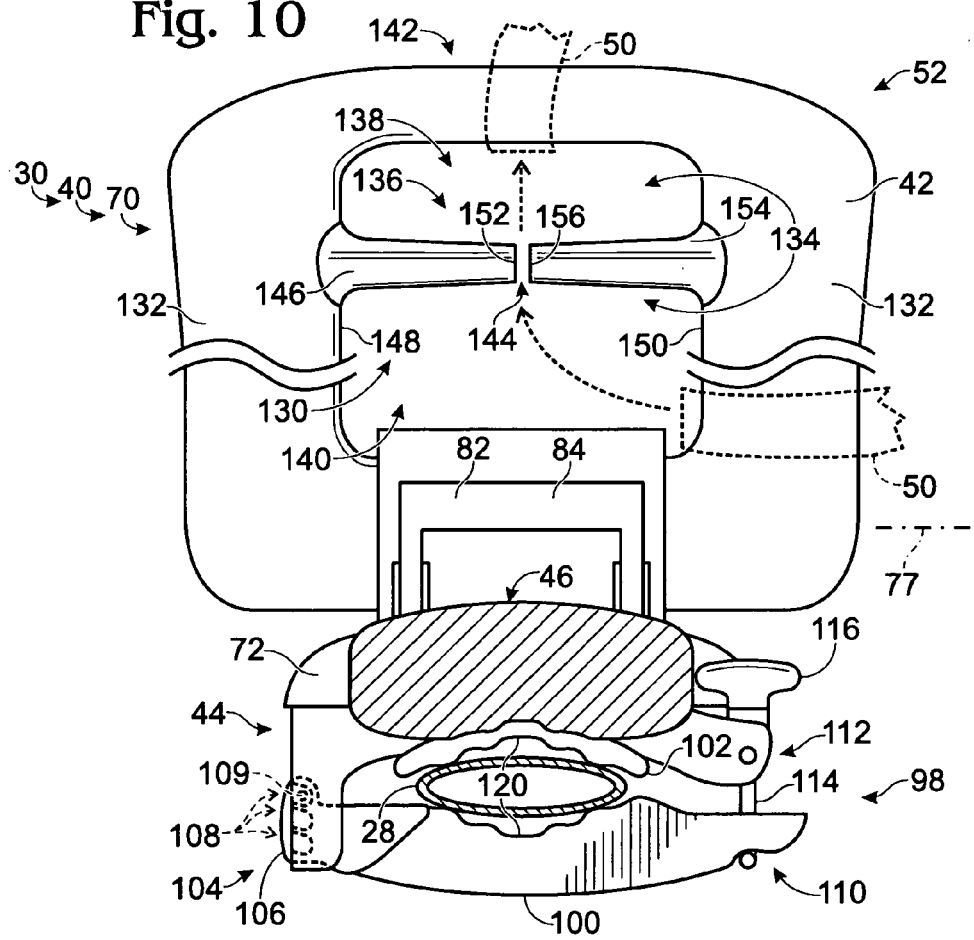
FIG. 10 is a section view of the folding J-cradle boat mount of FIG. 2, taken generally along line 10-10 in FIG. 4 and shown mounted to a horizontal oriented elliptical crossbar with the arm in an upright or extended position.
Figure 11:
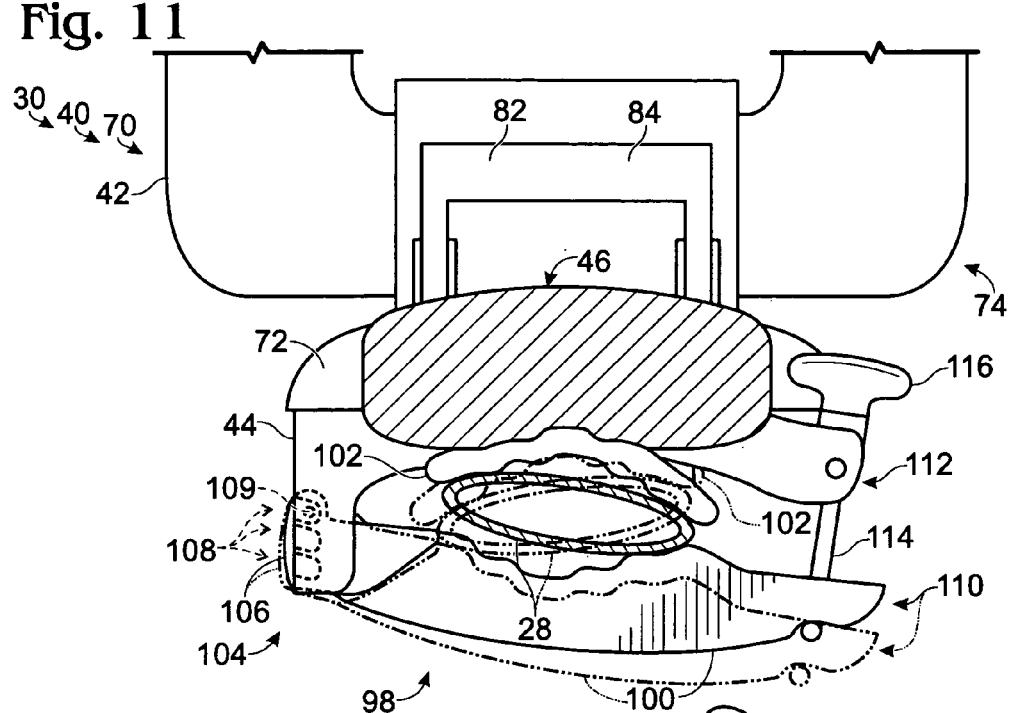
FIG. 11 is a section view of the folding J-cradle boat mount of FIG. 2, taken generally along line 10-10 in FIG. 4 and shown attached to various tilted elliptical crossbars.

A first end 106 of the clamping member 100 may be pivotably connected to the body 72 and configured to pivot about an axis 107, which may be substantially parallel to the cross bar 28. In some examples, the pivotable connection between the clamping member 100 and the body 72 may be adjustable or reconfigurable, such as to account for a variety of crossbar shapes and/or sizes. For example, as shown in FIGS. 10 and 11, the body may include a plurality of pivot points or sockets 108 that are configured to receive corresponding axle or pin 109 on the first end 106 of the clamping member 100, such that the clamping member 100 may be selectively pivotably attachable to a selected one of the sockets 108.

A second end 110 of the clamping member 100 may connected to the body 72 with a suitable biasing member 112. The biasing member 112 may be any device or mechanism configured to induce a sufficient clamping force between the clamping member 100 and the mounting blocks 102. For example, the biasing member 112 may include a threaded bolt 114 and corresponding knob 116, as shown in FIGS. 4, 5, 10 and 11. In some examples, the bolt 114 may be a T-bolt, with the T-head of the bolt being received against the clamping member, as shown in FIGS. 10 and 11. Other suitable biasing members may include a spring clamp, an over-center cam, an elastic member, or the like.

In some examples, the folding J-cradle boat mount 70 may be provided with an anti-theft or security locking mechanism, which may be configured to prevent unauthorized removal of the folding J-cradle boat mount 70 from the crossbar 28. For example, as shown in the nonexclusive illustrative example presented in FIGS. 2-9, the folding J-cradle boat mount 70 may include a key-lock system 118, which may be configured to prevent rotation of the knob 116 and/or the bolt 114 such that the clamping force between the boat mount 70 and the crossbar 28 cannot be released.

The use of a three point engagement between the folding J-cradle boat mount 70 and the crossbar 28, such as the single clamping member 100 and pair of opposing axially spaced apart mounting blocks 102 shown in FIGS. 4-5, may provide the folding J-cradle boat mount 70 with expanded compatibility. For example, such a three point engagement may permit mounting the folding J-cradle boat mount 70, or any other so-equipped load-carrying member 30, to a curved crossbar 28. For example, a load-carrying member 30 with a three point engagement may be mounted to a crossbar 28 having a vertical curvature. Furthermore, the spacing or distance between the mounting blocks 102 may be increased to enhance the stability of the engagement between the folding J-cradle boat mount 70 and the crossbar 28, such as to impede pivoting of the body 72 relative to the crossbar about an axis that is transverse to the crossbar, and/or decreased to fit on relatively short crossbars 28.

The mounting apparatus may be configured to engage a variety of crossbar shapes, sizes, and/or orientations. In particular, the clamping member 100 and/or the mounting blocks 102 may be configured to allow the folding J-cradle boat mount 70 to be mounted to a variety of crossbar configurations. For example, as shown in FIGS. 9-11, the engaging surfaces 120 of the clamping member 100 and/or the mounting blocks 102 may include a plurality of steps, notches, angles and/or grooves such that the clamping member 100 and/or the mounting blocks 102 may readily engage crossbars that have a wide range of shapes, sizes and/or cross-sections. Such a clamping member 100 and/or mounting blocks 102 may readily engage crossbars that are at least partially round, circular, elliptical, ovoid, square, rectangular, and/or polygonal.

In some examples, the clamping member 100 and/or the mounting blocks 102 may be configured to engage crossbars 28 that are angled. For example, where the crossbars lack radial symmetry, such as with rectangular or elliptical crossbars, as shown in FIGS. 10-11, the clamping member 100 and/or the mounting blocks 102 may be configured to permit angling of the folding J-cradle boat mount 70 relative to a symmetry plane of the crossbar 28. In some situations, such as where the crossbars are tilted forward or backward on a vehicle, angling or rotating the folding J-cradle boat mount 70 relative to a symmetry or other dividing plane of the crossbar 28 may permit securing the mount to the crossbar in a substantially upright position, such as where at least a portion of the load bearing surface is horizontal and/or the load bearing surfaces of multiple boat mounts are at least partially coplanar. To permit angling of the folding J-cradle boat mount 70, at least one of the mounting blocks 102 may be slidable, rotatable and/or translatable, such as along an arcuate path, relative to the body 72, as suggested in FIG. 11. For example, at least one of the mounting blocks 102 may be configured to slide relative to the body 72 along an arcuate path, such as the arcuate surface 122 suggested in FIG. 9, which may have a center of curvature or axis 123 that is substantially parallel to the crossbar 28. Furthermore, the plurality of pivot points or sockets 108 for the clamping member 100 may allow for improved alignment between the clamping member 100 and the crossbar 28 and/or the mounting blocks 102, such as where the mounting blocks 102 are in a rotated position as shown in FIG. 11.

The arm 42 may include at least one opening 130 therethrough. The strap 50 may be passed through the opening 130 when used to secure an article, such as the boat 32, to the folding J-cradle boat mount 70. For example, as shown in FIG. 2, the arm 42 may include two spaced apart members 132, which at least partially define an opening 130. In some examples, the opening 130 may be divided into a plurality of portions or regions 134. For example, as shown in FIG. 2, the arm 42 may include a divider 136, which may define a first or distal region 138 and a second or proximal region 140 of the opening 130. The distal region 138 may be used to at least partially retain the strap 50 proximate a distal end 142 of the arm 42. Inclusion of the distal region 138 may assist with loading a boat 32 into the folding J-cradle boat mount 70 because the strap 50 may be threaded or passed through the distal region 138 while the arm 42 is in the folded position such that the strap 50 will be pulled up with the arm 42 when the arm is rotated to the upright position, which will leave the strap ready to wrap over a boat.

The divider 136 may include a gap 144 that links the distal and proximal regions 138, 140 of the opening 130. For example, as shown in FIG. 10, the divider 136 may be in the form of at least one projection 146, which may extend from a first side 148 of the opening 130 toward a second side 150 of the opening 130. A distal end 152 of the projection 146 may be spaced from the second side 150 of the opening 130 such that a gap 144 exists between the distal end 152 and the second side 150 of the opening 130, with the gap 144 linking the distal and proximal regions 138, 140 of the opening 130. Although the divider 136 may include only the single projection 146, the examples shown in FIGS. 2 and 10 illustrate a divider 136 that also includes a second projection 154 that extends from the second side 150 of the opening 130 towards the first side 148 of the opening 130. The second projection 154 may be opposite the first projection 146, such that a distal end 156 of the second projection 154 may be proximate the distal end 152 of the first projection 146, with the gap 144 existing between the first and second distal ends 152, 156 such that the first and second projections 146, 154 together divide the opening 130 into the distal and proximal regions 138, 140.

The gap 144 that links the distal and proximal regions 138, 140 of the opening 130 may assist with threading the strap 50 through the distal region 138. For example, when the divider 136 includes a gap 144, the strap 50 may be inserted through the proximal region 140 of the opening 130, which may be larger than the distal region 138, and then passed through the gap 144 such that the strap 50 then passes through the distal region 138, as shown in FIG. 10. Initially inserting the strap through the proximal region 140 and then passing it to the distal region 138 may assist with threading larger straps and/or may permit usage of straps having buckles or other components that are larger than the distal region 138.

Figure 12:
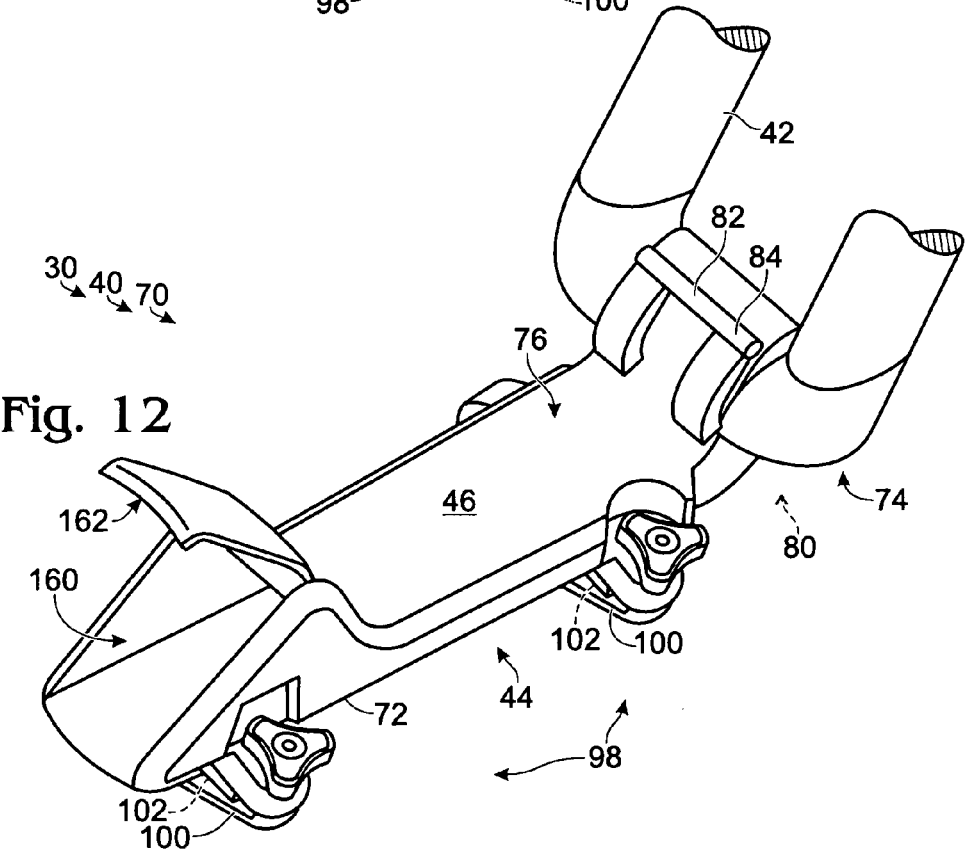
FIG. 12 is a perspective view of another nonexclusive illustrative example of a load-carrying member that includes an integral accessory storage compartment.

Another nonexclusive illustrative example of a load-carrying member 30 in the form of a folding J-cradle boat mount is shown generally at 70 in FIG. 12. Unless otherwise specified, folding J-cradle boat mount 70 may, but is not required to, contain at least one of the structure, components, functionality, and/or variations described, illustrated, and/or incorporated herein. Furthermore, the structures, components, functionalities, and/or variations described, illustrated, and/or incorporated herein in connection with the folding J-cradle boat mount 70 may, but are not required to, be included in other load-carrying members 30. The body 72 of the folding J-cradle boat mount 70 may include a storage compartment 160 to permit on-rack storage of an accessory, such as the strap 50. Storing the strap 50 in the storage compartment 160, which may include a lockable cover 162, allows secure, but convenient, storage of the strap when not in use.

In some examples, the body 72 of the folding J-cradle boat mount 70 may be secured to the crossbar 28 with multiple clamping members 100. For example, as shown in FIG. 12, the folding J-cradle boat mount 70 may include a pair of clamping members 100, each of which opposes and corresponds to at least one mounting block 102, which may be aligned with the clamping member.

Another nonexclusive illustrative example of a load-carrying member 30 in the form of a folding J-cradle boat mount is shown generally at 70 in FIG. 13. Unless otherwise specified, folding J-cradle boat mount 70 may, but is not required to, contain at least one of the structure, components, functionality, and/or variations described, illustrated, and/or incorporated herein. Furthermore, the structures, components, functionalities, and/or variations described, illustrated, and/or incorporated herein in connection with the folding J-cradle boat mount 70 may, but are not required to, be included in other load-carrying members 30.

Figure 15:
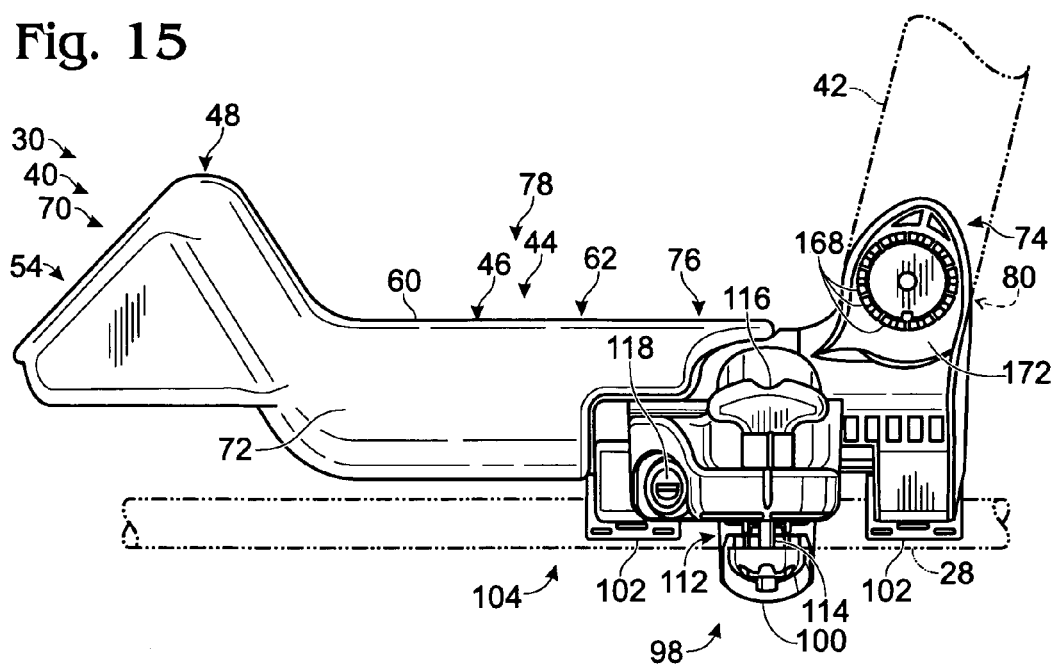
FIG. 15 is a front view of the body of the folding J-cradle boat mount of FIG. 13, shown with the arm omitted for clarity.
Figure 16:
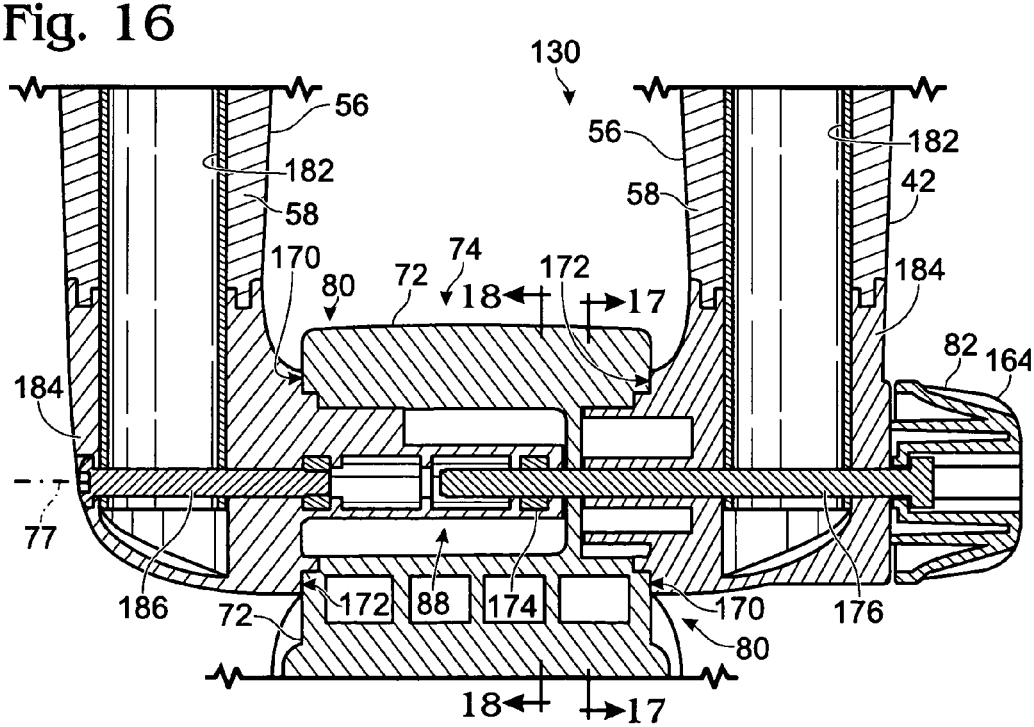
FIG. 16 is a section view of the folding J-cradle boat mount of FIG. 13, taken generally along line 16-16 in FIG. 13 and showing a nonexclusive illustrative example of a pivoting connection between the arm and body.
Figure 17:
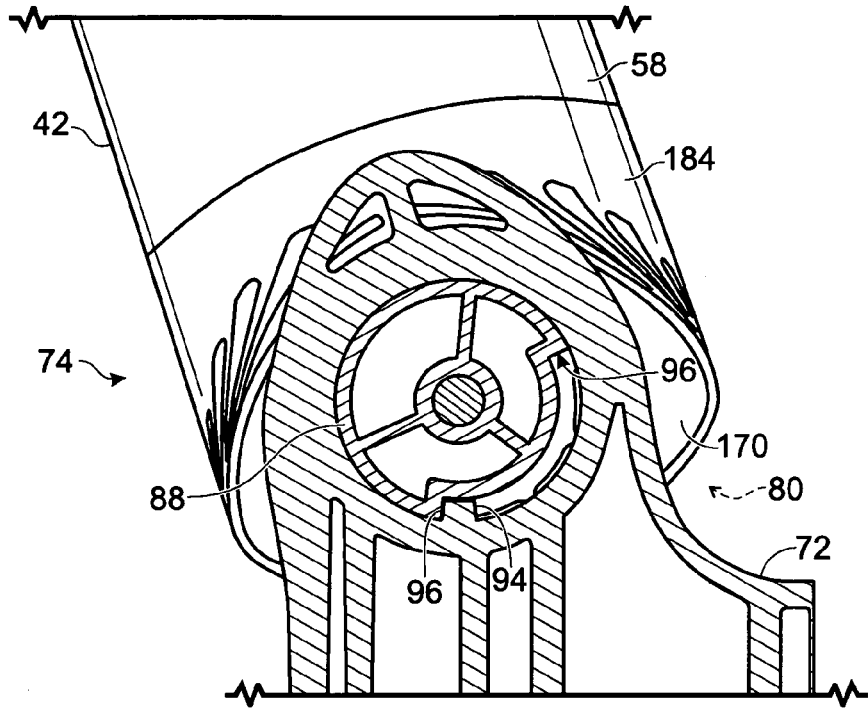
FIG. 17 is a section view of the folding J-cradle boat mount of FIG. 13 showing a nonexclusive illustrative example of rotational stops, taken generally along line 17-17 in FIG. 16 and shown with the arm in the upright or extended position.
Figure 18:
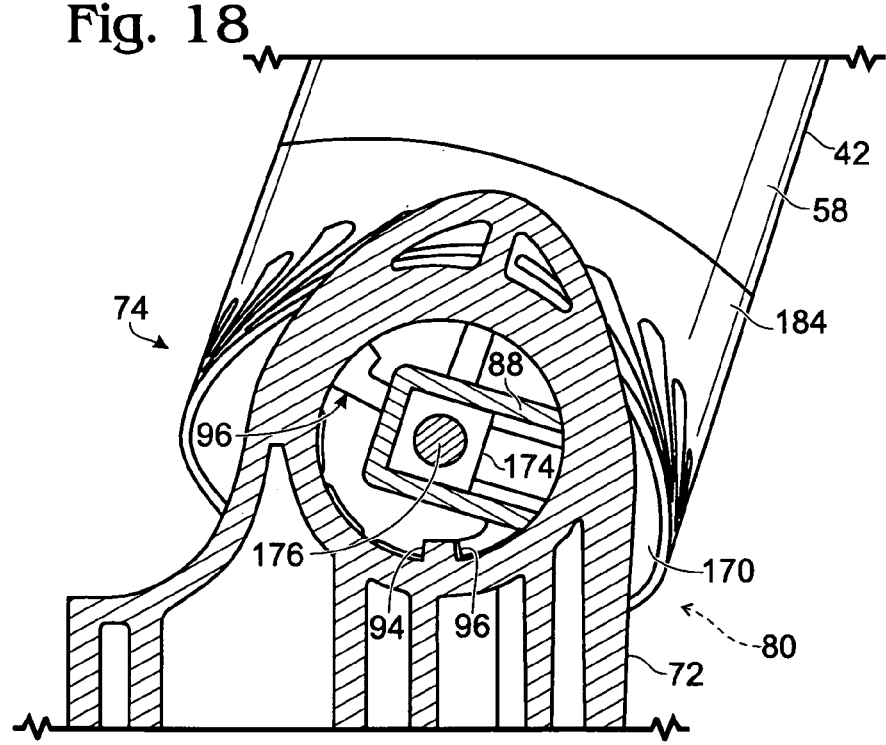
FIG. 18 is a section view of the folding J-cradle boat mount of FIG. 13 showing another nonexclusive illustrative example of rotational stops, taken generally along line 18-18 in FIG. 16 and shown with the arm in the upright or extended position.

Another nonexclusive illustrative example of a suitable locking mechanism for the folding J-cradle boat mount 70 is shown generally at 80 in FIGS. 14-18. As shown in FIG. 14, the locking mechanism 80 may include a suitable actuator 82, such as knob 164, and opposed mating ramped castellations 166, 168 disposed on the respective first and second mating surfaces 170, 172 of the arm 42 and the hub 74. When engaged, the castellations 166, 168 prevent relative rotation between the arm 42 and the hub 74. Engagement between the castellations 166, 168 may be induced by an inward bias between the spaced apart members 132 of the arm 42. Engagement between the castellations 166, 168 may be enhanced and/or induced by a nut 174 threaded onto bolt 176, as shown in FIG. 16, which are configured to draw together the spaced apart members 132 of the arm 42. The knob 164 may be used to urge the members 132 of the arm 42 together and bring the ramped castellations 166 on the first mating surface 170 into engagement with the ramped castellations 168 on the second mating surface 172. When the clamping pressure induced by the nut 174 and bolt 176 is released, such as by rotation of the knob 164, the ramped profile of the castellations 166, 168, coupled with attempted rotation of the arm 42 relative to the hub 74, may induce a spreading force into the spaced apart members 132 and cause a disengagement between the opposed mating ramped castellations 166, 168, which unlocks the hub to permit rotation of the arm. The castellations 166, 168 may be sized to provide a predetermined number of positions into which the locking mechanism 80 may lock the arm 42. Suitable numbers of locked positions may include 2, 3, 4, 5, 6, 7, and even 8, or more, positions. Further examples of mating castellations used as a rotational locking mechanism are illustrated in U.S. Pat. Application Pub. No. 2006/0032880 and U.S. Pat. No. 4,830,250, the complete disclosures of which are incorporated by reference in their entirety for all purposes.

As shown in FIGS. 13 and 15, the mounting blocks 102 may be spaced relatively close together, which may permit usage folding J-cradle boat mount 70 on relatively short crossbars 28, such as those found on vehicles having relatively narrow roofs or upper surfaces. As shown in FIG. 16, the spaced apart members 132 of the arm 42 may include tubes 182, which may be metal, that are secured or mounted to a proximal or hub engaging portion 184 of the arm 42 and covered with a molded padding 58. In the example shown in FIG. 16, a first one of the spaced apart members 132 is pinned to the hub engaging portion 184 by the bolt 176, and the second one of the spaced apart members 132 is pinned to the hub engaging portion 184 by another bolt 186.

In some examples, the folding J-cradle boat mount 70 may include one or more additional and/or accessory features. For example, as shown in FIG. 13 the folding J-cradle boat mount 70 may include a bottle cap opener 188, such as in the form of a suitable ledge and/or opening 188 on the body 72.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A load-carrying member for use with a vehicle rack, comprising:
   a body having a load-bearing surface and including a clamp configured to attach the body to a crossbar mounted to vehicle roof, with the load-bearing surface facing at least generally upward;
   an arm attached to the body and having a configuration in which the arm extends from the body in an upward direction that is transverse to the load-bearing surface, the arm having first and second elongate portions and defining an opening therethrough with the opening opposingly bounded by the elongate portions; and
   a divider extending from the arm and at least generally into the opening to divide the opening into a distal region and a proximal region linked by a gap.

2. The load-carrying member of claim 1, wherein the divider includes a first projection and a second projection that collectively define the gap.

3. The load-carrying member of claim 1, wherein the first projection and the second projection extend at least generally toward each other respectively from the first elongate portion and the second elongate portion of the arm.

4. The load-carrying member of claim 1, wherein the elongate portions are spaced laterally from each other and connected distally to each other such that the arm is at least generally U-shaped.

5. The load-carrying member of claim 1, wherein the gap spans a distance, further comprising a strap having a width that is greater than the distance spanned by the gap and having a thickness that is less than the distance spanned by the gap.

6. The load-carrying member of claim 1, wherein the arm is attached pivotably to the body.

7. The load-carrying member of claim 1, wherein the body and the arm collectively form a cradle that is at least generally shaped and at least generally oriented like a letter J, wherein the body includes a protrusion spaced from the arm such that the arm and the protrusion form opposing lateral boundaries of the cradle to restrict lateral motion of an article received in the cradle, and wherein the protrusion includes a ramp configured to guide the article over the protrusion and into the cradle.

8. The load-carrying member of claim 1, wherein each elongate portion includes an elongate core member and a padding layer disposed around the core member, and wherein the padding layer is provided by a sleeve that is circumferentially continuous.

9. The load-carrying member of claim 1, wherein each elongate portion includes an elongate core member and a padding layer disposed around the core member, and wherein the padding layer is provided by a molded sleeve.

10. A load-carrying member for use with a vehicle rack, comprising:
    a body having a load-bearing surface, wherein the body includes a clamp defining a first axis and configured to engage a crossbar mounted to a vehicle roof with the crossbar extending along the first axis; and
    an arm pivotably mounted to the body, wherein the arm is configured to pivot about a second axis that is transverse to the first axis between a first position in which the arm is proximate the load bearing surface and a second position in which the arm is transverse to the load-bearing surface, wherein the body and the arm in the second position collectively form a cradle that is at least generally shaped and at least generally oriented like a letter J; wherein the arm has first and second elongate portions spaced laterally from each other, wherein the arm includes an opening therethrough, wherein the opening is opposingly bounded by the elongate portions, and wherein the at least one projection extends from the arm and at least generally into the opening to divide the opening into a distal region and a proximal region linked by a gap.

11. The load-carrying member of claim 1, further comprising a locking mechanism, wherein the locking mechanism is configured to selectively lock the arm into at least one of the first position, the second position, and at least one position intermediate the first and second position.

12. The load-carrying member of claim 11, wherein the body includes a hub, the arm is pivotably attached to the hub, the arm includes a first mating surface, the hub includes a second mating surface, and the locking mechanism comprises mating ramped castellations on the first and second mating surfaces.

13. The load-carrying member of claim 12, wherein the locking mechanism comprises an actuator configured to urge the ramped castellations on the first mating surface into engagement with the ramped castellations on the second mating surface.

14. The load-carrying member of claim 11, wherein one of the arm and the body includes a tab and the other of the arm and the body includes at least one stop, and contact between the tab and the at least one stop impedes pivoting of the arm relative to the body.

15. The load-carrying member of claim 10, wherein the arm is pivotably mounted proximate a first region of the load-bearing surface, the load-bearing surface includes a protrusion spaced from the first region, and the arm in its second position and the protrusion are configured to at least partially retain therebetween an article disposed on the load-bearing surface.

16. The load-carrying member of claim 15, wherein the protrusion includes a ramp configured to guide the article over the protrusion and onto the load-bearing surface.

17. The load-carrying member of claim 1, wherein the arm is at least generally U-shaped, wherein the at least one projection includes a first projection and a second projection extending at least generally into the opening respectively from the first elongate portion and the second elongate portion, and wherein the gap is formed between an end of the first projection and an end of the second projection.

18. The load-carrying member of claim 10, wherein the second axis is perpendicular to the first axis.

19. The load-carrying member of claim 10, wherein the arm includes an elongate core portion and a padding layer disposed around the core portion, and wherein the padding layer is provided by a sleeve that is circumferentially continuous.

* * * * *